United States Patent [19]

Jenkins

[11] 4,175,643
[45] Nov. 27, 1979

[54] LUBRICATING SYSTEM FOR POWER TRANSMITTING APPARATUS

[75] Inventor: David K. Jenkins, Lathrup Village, Mich.

[73] Assignee: Rockwell International Corporation, Pittsburgh, Pa.

[21] Appl. No.: 639,931

[22] Filed: Dec. 11, 1975

[51] Int. Cl.$^2$ .............................................. F16N 7/36
[52] U.S. Cl. .................. 184/11 A; 184/6.12; 74/467; 74/710
[58] Field of Search ................. 184/11 R, 11 A, 11 B, 184/6.12, 6; 74/710

[56] References Cited
U.S. PATENT DOCUMENTS

| 874,883 | 12/1907 | Clarke | 184/11 A |
|---|---|---|---|
| 2,147,145 | 2/1939 | Carlson | 184/11 A |
| 2,147,146 | 2/1939 | Carlson | 184/11 A |
| 3,529,698 | 9/1970 | Nelson | 184/11 A |
| 3,719,253 | 3/1973 | Dukes | 184/11 R |

Primary Examiner—David H. Brown

[57] ABSTRACT

A lubricating system is for a forward bearing and a rear bearing of an input shaft of an interaxle differential. The interaxle differential includes a housing having an oil sump therein and a number of elements thereof capable of rotating within the housing to splash oil about the interior of the housing. The lubricating system includes supply ports through the housing respectively aligned with the bearings which are capable of supplying oil thereto by gravity flow. An interaxle differential casing is mounted on the shaft for rotation therewith between the bearings and has an outer surface which is coaxially aligned with the shaft. An oil removing device is aligned with the outer surface of the interaxle differential casing to remove oil therefrom during rotation. A first channel extends forwardly and downwardly from the oil removing device to the supply port of the forward bearing for gravity transfer of oil thereto. A second channel extends rearwardly and downwardly from the oil removing device to the supply port for the rear bearing for gravity transfer of the oil thereto.

1 Claim, 4 Drawing Figures a
LUBRICATING SYSTEM FOR POWER TRANSMITTING APPARATUS

BACKGROUND OF THE INVENTION

1. Field of the Invention

This invention relates to a lubricating system for a power transmitting apparatus and, more specifically, to such a system for the forward bearing and rearward bearing of the input shaft of an interaxle differential.

2. Description of the Prior Art

There have heretofore been utilized a number of lubricating systems for interaxle differentials of the type disclosed in U.S. Pat. No. 3,719,253. The lubricating system shown in this patent includes a gear driven pump for positive supply of lubricating oil to various elements within the interaxle differential. However, it is not uncommon to utilize splash lubrication of lubricating oil which, although not as reliable, is less expensive than providing a pump for this purpose. Splash lubrication does not generally insure that lubricating oil will be accurately or sufficiently supplied to the various elements therein requiring lubrication. Two elements of an interaxle differential which are particularly in need of reliable lubrication are the forward bearing and rear bearing of the input shaft of the interaxle differential.

SUMMARY OF THE INVENTION

It is therefore an object to provide a reliable lubricating system for the forward and rear bearings of an input shaft without the use of a positive displacement lubricating pump.

It is a further object to provide such a system which is relatively inexpensive and uncomplicated to manufacture.

These and other objects are provided in a preferred embodiment of the invention in the form of a lubricating system for a forward bearing and a rear bearing of a shaft in a power transmitting apparatus of the type which includes a housing having a liquid lubricant sump therein and a number of elements thereof which are capable of rotating within the housng to splash the liquid lubricant about the interior of the housing. The lubricating system includes a first supply port and a second supply port through the housing respectively aligned with the forward bearing and the rear bearing which are capable of supplying liquid lubricant thereto by gravity flow. A member is mounted on the shaft between the bearings for rotation therewith and includes an outer surface thereon which is coaxially aligned with the shaft. There is included means for removing liquid from the outer surface of the member during rotation of the shaft. A first channel extends forwardly and downwardly from the means for removing liquid lubricant to the first supply port for gravity transfer of the liquid lubricant thereto. A second channel extends rearwardly and downwardly from the means for removing liquid lubricant to the second supply port for gravity transfer of liquid thereto.

DETAILED DESCRIPTION OF THE PREFERRED EMBODIMENT

Figure 1:
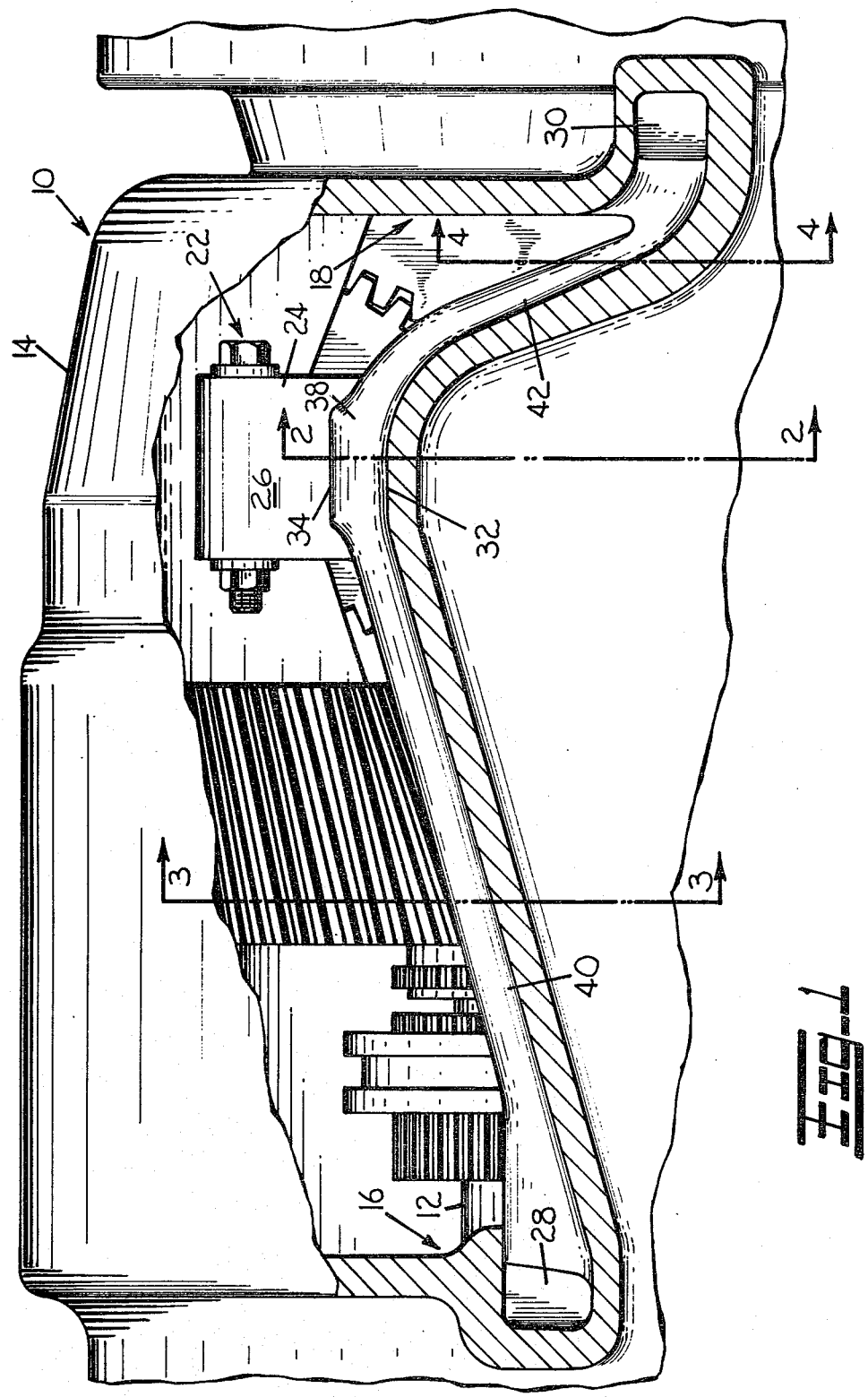
FIG. 1 is a fragmentary, partially in section, view of an interaxle differential and the housing thereof including various features of the invention.

As seen in FIG. 1, an interaxle differential 10 includes an input shaft 12 and is of the type generally shown in U.S. Pat. No. 3,719,253, which is incorporated herein by reference. A housing 14 generally encloses the interaxle differential 10 and includes an oil sump in the lower portion thereof, which is not shown in FIG. 1 but is disclosed in the above mentioned patent. The lubricating oil sump includes a sufficient quantity of lubricating oil to provide splash lubrication about the interior of the housing 14 as the various elements within the interaxle differential 10 rotate.

The input shaft 12 is mounted on a forward bearing 16 and rear bearing 18 mounted in the housing 14. Although the bearings 16 and 18 are not shown in FIG. 1, they are preferably tapered bearings of the type shown in the above mentioned patent. The input shaft 12 includes thereon a helical drive gear 20 for operation of the forward axle and an interaxle differential mechanism 22 which enables power to be transmitted to the rear axle. The interaxle differential mechanism 22 includes a casing 24 having an outer surface 26 thereon which is coaxially aligned with the input shaft 12.

Lubrication for the forward bearing 16 and rear bearing 18 is normally supplied in a manner known in the art and generally shown in the above mentioned patent by a first supply port 28 and a second supply port 30, respectively, formed in the walls of the housing 14. To supply lubricating oil to the first supply port 28 and the second supply port 30, which will by gravity flow supply oil to the bearings thereof, it is desirable for lubricating oil that is splashed about the interior of the housing 14 to be collected and directed thereto.

Figure 2:
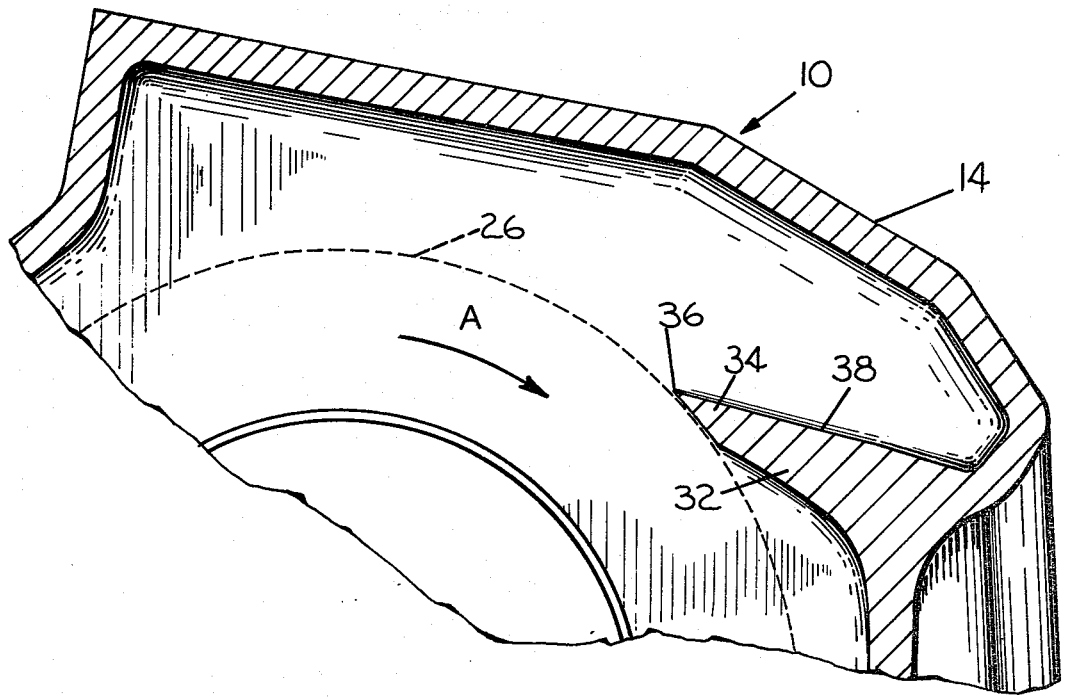
FIG. 2 is a view as seen along line 2—2 of FIG. 1.
Figure 3:
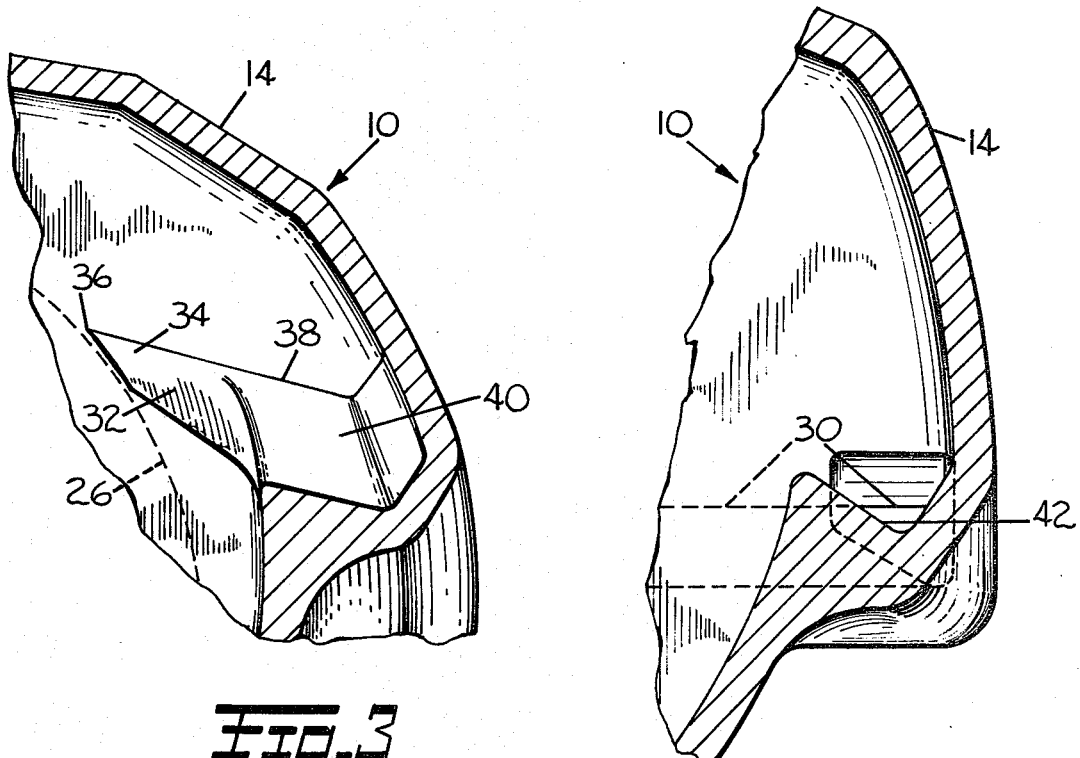
FIG. 3 is a view as seen along line 3—3 of FIG. 1.

This is accomplished in the present invention by an oil scraping device 32 which is integrally formed in the interior of the housing 14 in alignment with the outer surface 26 of the interaxle differential casing 24. As also seen in FIGS. 2 and 3, the oil scraping device 32 extends slightly upwardly from the housing 14 to terminate at an end 34 thereof, which is in close proximity to the outer surface 26. As the interaxle differential casing 24 rotates in the direction indicated by the arrow A when the vehicle is operating in a forward direction, oil splashed on the outer surface 26 will be carried toward the end 34 of the oil scraping device 32.

In the preferred embodiment the radius of the interaxle differential casing is approximately three and one-half inches and the space 36 between the end 34 and the outer surface 26 is designed to be about one thirty-second to one sixteenth of an inch. Maintaining the space 36 within this range ensures a significant quantity of oil on the outer surface 26 of the interaxle differential casing 24 will be removed therefrom to pass downwardly along the upper surface 38 of the oil scraping device 32.

As lubricating oil is received on the upper surface 38 of the oil scraping device 32 it will not tend to collect thereon because of the inclusion in the preferred embodiment of a first channel 40 and a second channel 42 which are formed on the interior wall of the housing 14. As seen in FIG. 3, the first channel 40 extends forwardly and downwardly from the oil scraping device 32 to the first supply port 28. The first channel 40 is of a sufficient depth and has a sufficient slope thereon to ensure gravity transfer of the oil from the scraping device 32 to the port 28.

Figure 4:
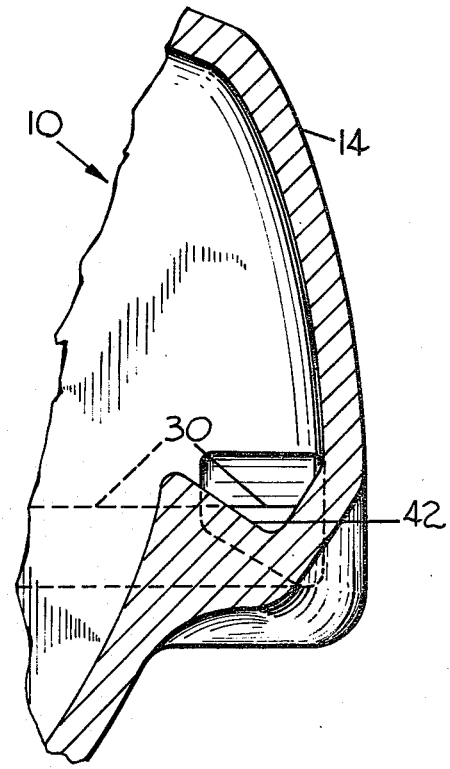
FIG. 4 is a view as seen along line 4—4 of FIG. 1.

Similarly, as seen in FIG. 4, the second channel 42 provides gravity transfer of oil to the second supply port 30. Accordingly, the preferred embodiment of the invention ensures a sufficient quantity of lubricating oil will be provided the forward bearing 16 and the rear bearing 18 whenever the input shaft 12 is rotating in the forward direction as oil on the outer surface 26 is "forced" by its movement past the oil scraping device 32 into the channels 40 and 42.

It should be apparent that the lubricating system described hereinabove could be readily employed for other shafts than an output shaft within the power transmitting apparatus. Any rotating member on a shaft might be provided an outer surface from which oil could be removed and channeled for lubrication of the shaft bearings.

While there has been shown and described herein the preferred embodiment of the invention, it will be obvious to those skilled in the art that changes and modifications may be made therein without departing from the invention as claimed.

What is claimed is:

1. A lubricating system for a forward bearing and a rear bearing of a shaft in an interaxle differential assembly, said interaxle differential assembly being of the type which includes a housing having a liquid lubricant sump therein and a number of elements thereof capable of rotating within said housing to splash said liquid lubricant about the interior of said housing, said lubricating system comprising:

a first supply port and a second supply port through said housing respectively aligned with said forward bearing and said rear bearing capable of supplying liquid lubricant thereto by gravity flow;

an interaxle differential housing having a casing and being mounted on said shaft between said bearings for rotation therewith, said casing having an outer surface thereon coaxially aligned with said shaft;

means for removing said liquid lubricant from said outer surface during rotation of said shaft, said means for removing said liquid lubricant from said outer surface being an oil scraping device which is formed integrally with said housing and extends rigidly from an interior surface thereof toward said outer surface in close proximity thereto;

a first open channel extending forwardly and downwardly of said oil scraping device to said first supply port for gravity transfer of said liquid lubricant thereto;

a second open channel extending rearwardly and downwardly of said oil scraping device to said second supply port for gravity transfer of said liquid lubricant thereto; and said first channel and said second channel being formed integrally with said housing and extending rigidly from said interior surface thereof.

* * * * *